(12) United States Patent
Ljøsne

(10) Patent No.: US 12,715,544 B2
(45) Date of Patent: Aug. 25, 2026

(54) VEHICLE GEAR SHIFT SYSTEM

(71) Applicant: MONT INVEST 30 AS, Oslo (NO)

(72) Inventor: Knut Tore Ljøsne, Lom (NO)

(73) Assignee: MONT INVEST 30 AS, Oslo (NO)

( * ) Notice: Subject to any disclaimer, the term of this patent is extended or adjusted under 35 U.S.C. 154(b) by 0 days.

(21) Appl. No.: 18/719,729

(22) PCT Filed: Dec. 16, 2022

(86) PCT No.: PCT/NO2022/050312

§ 371 (c)(1),
(2) Date: Jun. 13, 2024

(87) PCT Pub. No.: WO2023/113614

PCT Pub. Date: Jun. 22, 2023

(65) Prior Publication Data

US 2025/0050972 A1 Feb. 13, 2025

(30) Foreign Application Priority Data

Dec. 16, 2021 (NO) .................................... 20211516

(51) Int. Cl.
*B62M 25/08* (2006.01)
*B62M 6/45* (2010.01)
(Continued)

(52) U.S. Cl.
CPC ............... *B62M 25/08* (2013.01); *B62M 6/40* (2013.01); *B62M 6/45* (2013.01); *B62M 2025/006* (2013.01)

(58) Field of Classification Search
CPC B62M 25/08; B62M 2025/006; B62M 11/04; F16H 61/28; F16H 61/32;
(Continued)

(56) References Cited

U.S. PATENT DOCUMENTS 4,946,425 A * 8/1990 Buhlmann ............ B62M 9/122
280/238
5,328,414 A 7/1994 Ancarani
(Continued)

FOREIGN PATENT DOCUMENTS

CN 109070725 A 12/2018
NO 20201065 A1 3/2022
(Continued)

OTHER PUBLICATIONS

Search Report, issued in Norwegian Patent Application No. 20211516 dated Mar. 28, 2025.
(Continued)

*Primary Examiner* — Tinh T Dang
(74) *Attorney, Agent, or Firm* — NIXON & VANDERHYE

(57) ABSTRACT

A vehicle and a vehicle gear shift system (1) comprising: —an energy source (20); —an energy storage element (30), and —a longitudinal energy transfer element (50, 150) configured to interconnect the gear shift element (10) and the energy storage element (30); wherein the energy source (20) is configured to load or charge the energy storage element (30) with potential energy via a movement of the energy transfer element (50) in its longitudinal direction with regards to the energy storage element.

11 Claims, 6 Drawing Sheets

(51) Int. Cl.

| | |
|---|---|
| ***B62M 11/04*** | (2006.01) |
| *B62M 6/40* | (2010.01) |
| *B62M 25/00* | (2006.01) |

(58) Field of Classification Search

CPC ..... F16H 2061/2884; F16H 2061/2892; F16H 2063/3089

See application file for complete search history.

(56) References Cited

U.S. PATENT DOCUMENTS

| | | | | |
|---|---|---|---|---|
| 5,735,767 | A * | 4/1998 | Forsyth | F16D 23/06 475/205 |
| 2007/0163372 | A1 | 7/2007 | Bar et al. | |
| 2009/0293661 | A1 | 12/2009 | Kayukawa et al. | |
| 2019/0128417 | A1* | 5/2019 | Schulte | F16D 11/14 |
| 2019/0152316 | A1* | 5/2019 | Wentz | B60K 17/344 |
| 2023/0331345 | A1 | 10/2023 | Ljøsne | |

FOREIGN PATENT DOCUMENTS

| | | | |
|---|---|---|---|
| WO | 2009038466 | A1 | 3/2009 |
| WO | 2012128639 | A1 | 9/2012 |
| WO | 2017149396 | A2 | 9/2017 |
| WO | 2020130841 | A1 | 6/2020 |

OTHER PUBLICATIONS

International Search Report for PCT/NO2022/050312, mailed Dec. 16, 2022, 3 pages.

Written Opinion of the ISA for PCT/NO2022/050312, mailed Dec. 16, 2022, 7 pages.

Search Report, issued in Taiwanese Patent Application No. 110135985 dated May 26, 2025.

Office Action, issue in Taiwanese Patent Application No. 111148122 dated Mar. 18, 2026.

Office Action, issued in Taiwanese Patent Application No. 11520261030 dated Mar. 16, 2026.

Office Action, issued in Taiwanese Patent Application No. 111148122 dated Mar. 16, 2026.

* cited by examiner

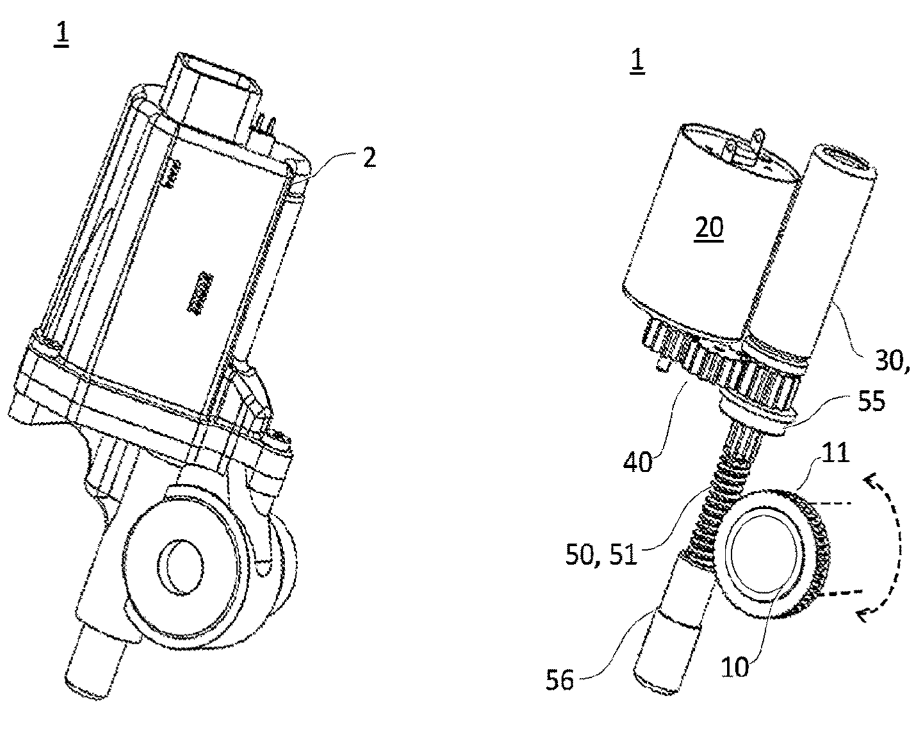
Fig.1
Fig.2
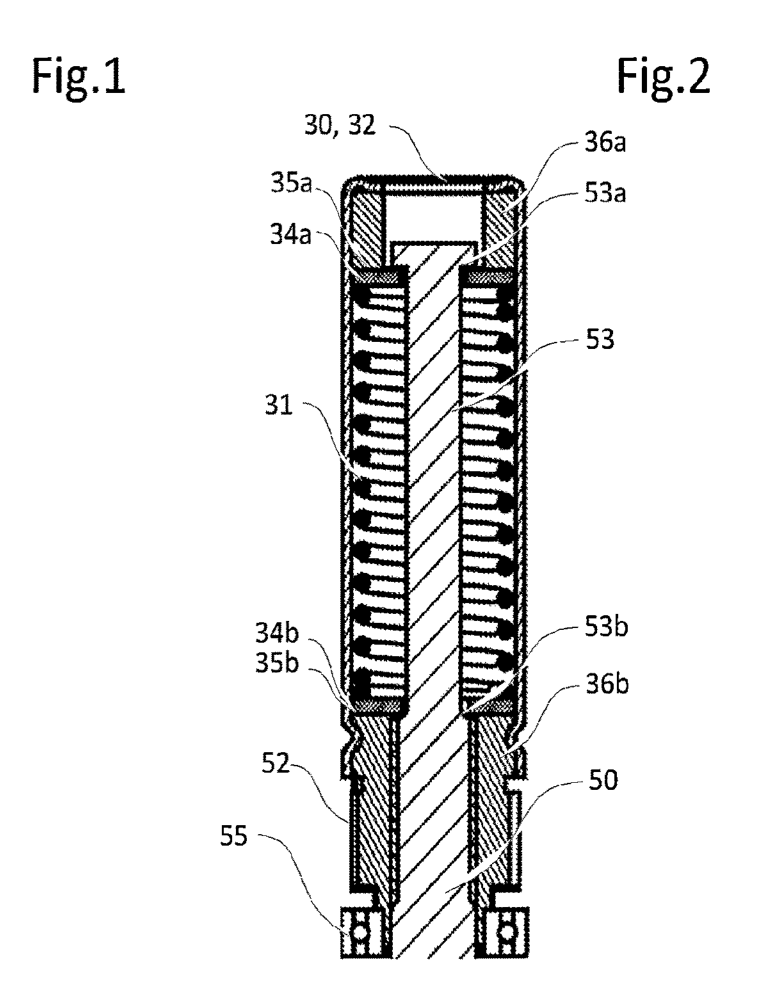
Fig.3

A
A 30, 32
53
31
52
55
10
11
A - A
50, 51
56

A - A

A - A

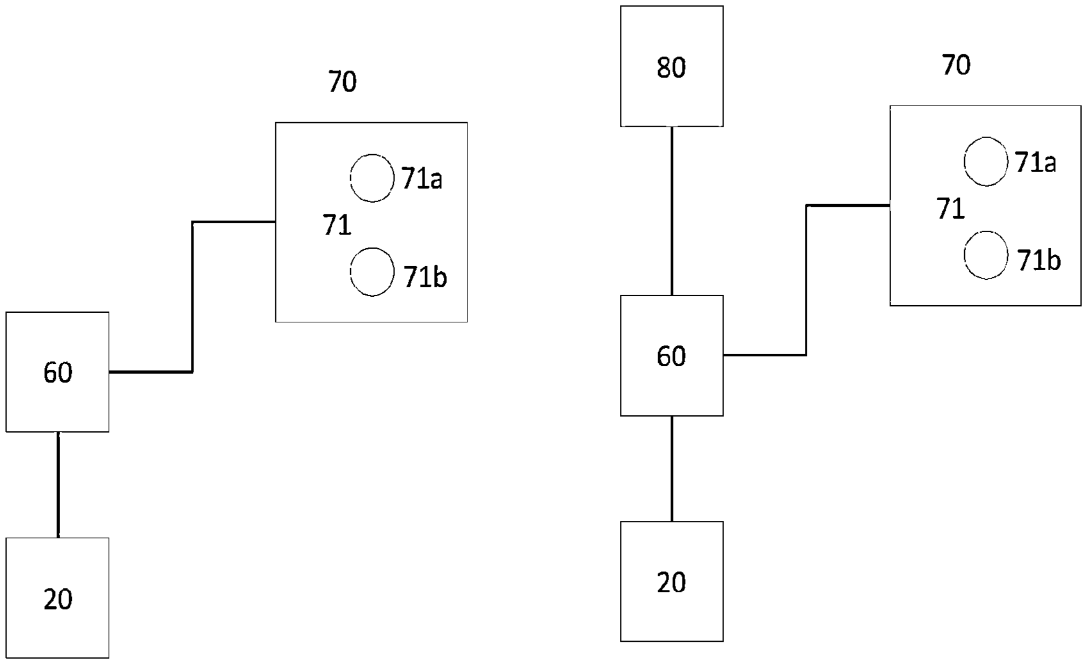
Fig. 6a
Fig. 6b
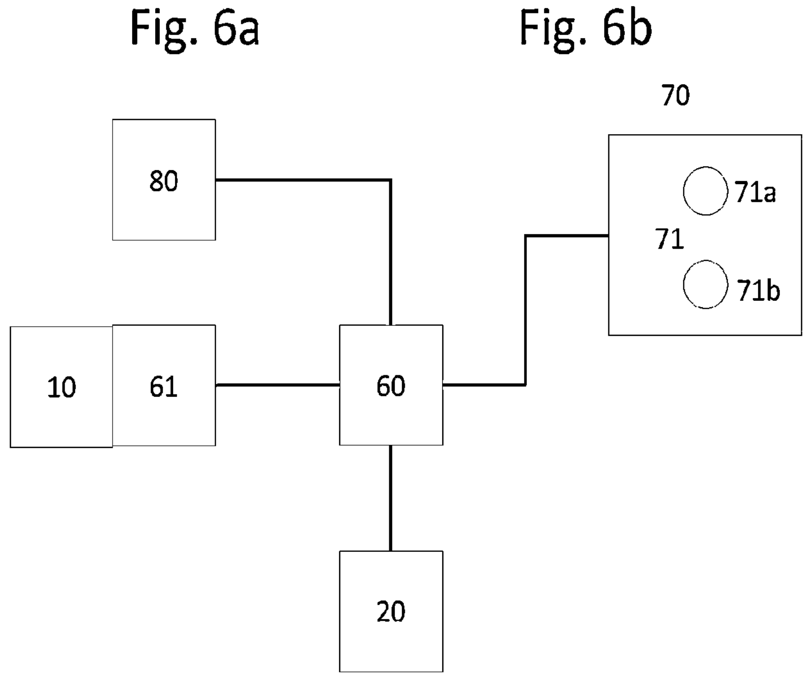
Fig. 6c

VEHICLE GEAR SHIFT SYSTEM

CROSS-REFERENCE TO RELATED APPLICATIONS

This application is the U.S. national phase of International Application No. PCT/NO2022/050312 filed Dec. 16, 2022 which designated the U.S. and claims priority to NO 20211516 filed Dec. 16, 2021, the entire contents of each of which are hereby incorporated by reference.

TECHNICAL FIELD

The present invention relates to an improved gear shift system for a vehicle. The invention is of specific relevance for vehicles with multiple gears, where shifting is performed under torque and/or where the performance of the vehicle is seriously affected by the torque loss during shifting. Such vehicles could be e.g., pedally propelled vehicles where the pedaling is assisted by a motor, such as for an electric bicycle, but it may also be implemented in relation to gear shifting of multi-speed gear systems where no such motor-assist is available, or for motor-only driven vehicles, e.g., tractors or other heavy machinery.

BACKGROUND

As described initially, the invention can be used in a wide range of applications. One such application is pedally propelled vehicles.

Most pedally propelled vehicles, such as bicycles are equipped with some sort of selectable gear ratio to improve pedaling efficiency and comfort.

Different from gears in other types of vehicles that are motor driven, where a gear shift system and motor drive system can co-operate during the gear shift, a bicycle control system is not able to control the rider and the torque from the rider on the pedals in the same way.

Experienced riders have therefore developed their own understanding and application of a shifting scheme. The optimum shifting scheme will depend on the type of bicycle, the characteristics of the rider etc., which means that practically no shifting schemes will be the same.

This is cumbersome, and one can easily observe that less experienced, and even experienced riders struggle to shift gears efficiently in certain situations.

With the introduction of electrical bikes, where pedaling is supported by a motor drive, the same problem remains. The shift control system can control the contribution from the motor, but not from the rider.

While many experienced riders in the sport segment have accepted and even appreciate developing their own shifting scheme, shifting remains a hurdle for many riders, and for any pedally propelled vehicle with motorized support, such as standard pedelecs, moped style e-bikes, electric cargo vehicles with two or more wheels, mountain bikes, leisure bikes, commuter bikes etc., this problem is increasing with the number of such vehicles and riders affected.

The pedaling rate is defined as the number of revolutions of the crank shaft per unit time. This is also termed the cadence and is mostly defined as rounds per minute (rpm).

Although an optimal cadence is unique for every rider, it is clear that the human physiology in general does not allow large variations in cadence in order to maintain efficient power production and comfort.

Most modern bicycles are therefore equipped with some sort of variable gear mechanism to vary the relationship between the cadence and the rotational speed of the drive wheel. By changing the gear ratio, the desired cadence can be selected for different speeds and different cycling conditions, such as e.g. uphill or downhill.

The gear shift is performed by a gear shift mechanism. The type of gear shift mechanism will depend on the type of gear system used in the specific case.

However, efficient shifting of gears on a bicycle requires precision and timing. Experienced riders know that they should shift close to the dead point of the crank to reduce the torque from the riders feet present on the gear mechanism. A large torque makes shifting more difficult and will usually reduce the lifetime of the shift mechanism and the transmission.

E-bikes add more complexity to the gear shifting. In addition to the torque from the rider, the torque from the motor should be taken into account as well. If the experienced rider eases off the pedals for shifting, the shifting mechanism will still struggle if a large torque from the electric motor is present. Vice-versa will a large torque from the rider represent a problem for shifting, even in the event that the control system is able to reduce the torque from the motor during shifting temporarily.

Thus, there is a need for an improved shifting mechanism that takes the responsibility for smooth and efficient shifting off the experienced or less experienced rider.

WO2012128639A1 and WO2020130841 disclose multi-speed gear systems for a pedally propelled vehicle.

WO207149396 discloses a sequential gear shifter for a multi-speed system.

Some electric vehicle gear shift systems exist in the market today, and they may be used for shifting of gears under operating conditions where the shift axle can be easily rotated, e.g., where there is little counter torque on the shift axle from a rider or an assisting electric motor.

However, as soon as counter torque increases, gear shifting becomes more challenging, and technical solutions are missing.

SHORT SUMMARY

One possible solution for solving the problem described above, would be to increase the power of the energy source or the electric motor with the cost of a larger and less applicable unit. In addition, a larger motor requires more power and a larger battery. Another alternative would be to alter the gear ratio of the gear drive 40, in order to increase the torque available for rotating the shift axle. The drawback here is that the speed of the gear shifts will slow down, which in itself will prevent the gear shift system to give the rider a good shifting experience.

It is also worth mentioning that for many gear shifts, such as shifting to a heavier gear downhill, the counter torque is usually small, and in such situations the above proposed solutions would only reduce the usefulness of the gear shift system. It is therefore a goal of the present invention to provide a gear shift system that do not have the drawbacks of increased size, increased power or slower shifting.

The invention is a vehicle gear shift system as set out in independent claim 1, where the problem identified above has been solved.

The shift system has one or more of the following advantages over prior art.

First of all, a multispeed gear system with the gear shift system according to the invention will in many situations shift more instantly than prior art solutions, and torque loss during shifting may be reduced.

In the case of a pedally propelled vehicle, the shifting will be more reliable and predictable, since it is less dependent on the behavior of the rider.

The gear shift system can in many cases easily be integrated with existing multi-speed gear systems.

The gear shift system comprises only a small number of components that are easily manufacturable.

The gear shift system requires little additional space over a prior art shift actuator without the additional features proposed.

The gear shift system can be used both for up- and down shifts.

The gear shift system can be used for different types of vehicle configurations, whether the multispeed gear system is arranged e.g. in the wheel hub or near the crank for pedally propelled vehicles, and for vehicles in general with or without motor support.

BRIEF DESCRIPTION OF THE DRAWINGS

FIG. 1 illustrates in an isometric view a vehicle gear shift system 1 according to an embodiment of the invention. The internal parts are hidden by the housing 2. On the top of the housing there are electric connectors for electric power supply and connection to a control system. The communication with the control system could also be wireless, and in this case no physical control interface would be required.

FIG. 2 illustrates in an isometric view the same vehicle gear shift system 1 as in FIG. 1, where the housing 2 has been removed. The main elements are the energy source 20, the energy storage element 30, the shift axle 10 of a multi gear system and the energy transfer element 50.

FIG. 3 is a section view of the energy storage element 30 in an embodiment of the invention.

FIG. 6*a* illustrates in a simplified block diagram an embodiment of how the control system 60 interacts with the energy source 20 and a gear operator 70 with a gear operator sensor 71. The gear operator sensor comprises an up-shift sensor 71*a* and a down-shift sensor 71*b*. When the rider activates the up-shift sensor, the control system 60 enables the energy source 20 to provide potential energy to the energy storage element. When the rider activates the down-shift sensor, the control system 60 enables the energy source 20 to provide potential energy to the energy storage element. However, the potential energy in the two cases have different signs. E.g. if the energy source is a motor, the motor will rotate in one direction when he up-shift sensor is pushed, and in the opposite direction when the down-shift sensor is pushed.

FIG. 6*b* illustrates in a simplified block diagram an embodiment of how the control system 60 interacts with the energy source 20 and a gear operator 70 with a gear operator sensor 71 in the same way as the embodiment in FIG. 7. In this case the vehicle comprises a drive motor 80 controlled by the control system.

FIG. 6*c* illustrates another embodiment of the control system, where the control system in addition to the features illustrated in FIG. 7*b*, operates based on the position of the shift element 2, as detected by the gear position detector 61. I.e., the control system may use the detected gear position as input for operating the energy source 20.

EMBODIMENTS OF THE INVENTION

Figures 4A, 4B, 4C, 4D:
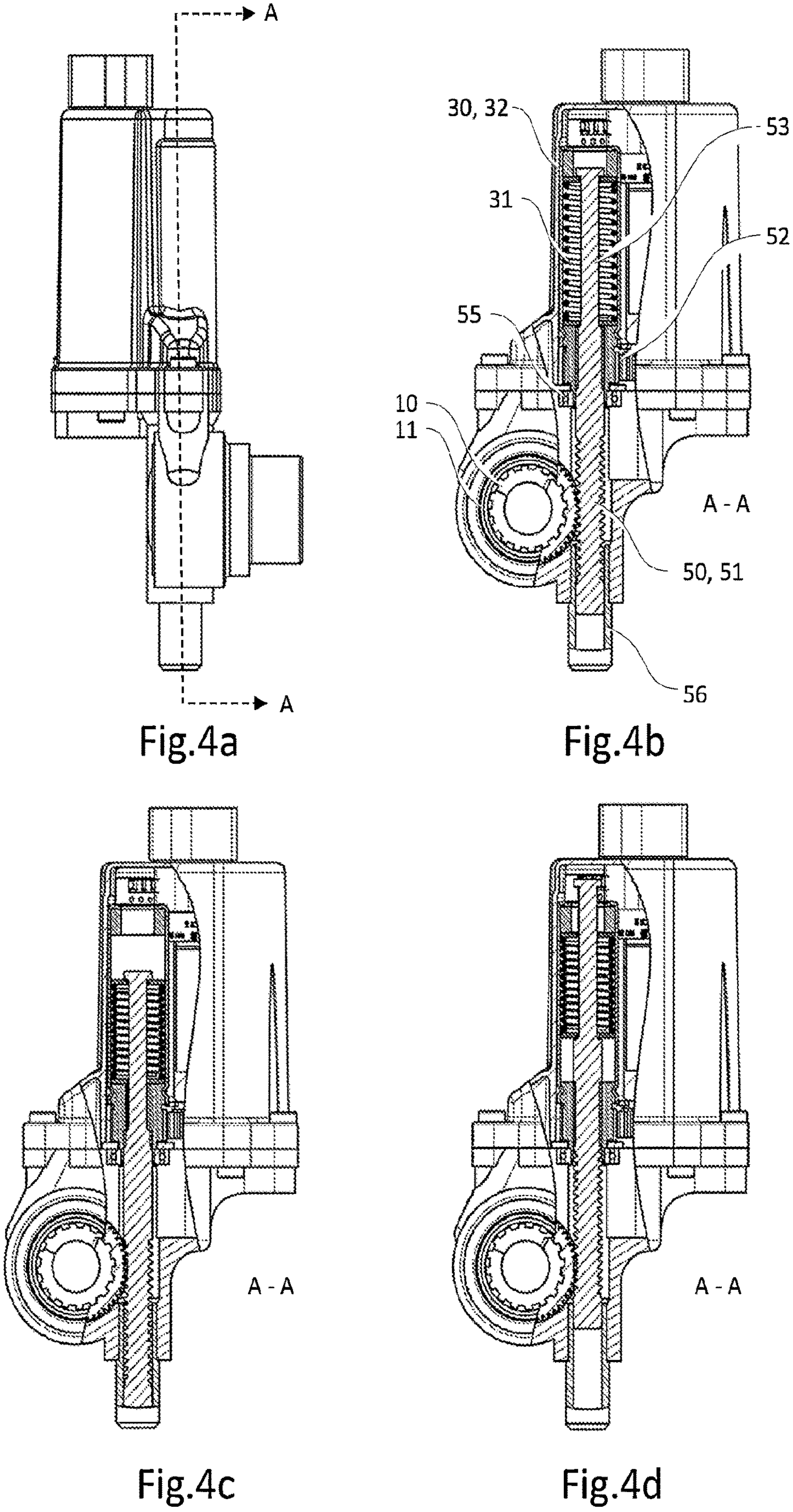
FIG. 4*a* illustrates in a front view the same embodiment of the vehicle gear shift system 1 as in FIG. 1.
FIG. 4*b* illustrates in a partly sectionalized view the vehicle gear shift system 1 of FIG. 4*a*. Here the energy storage element 30 is in a neutral, or equilibrium position.
FIG. 4*c* illustrates in a partly sectionalized view the vehicle gear shift system 1 of FIG. 4*a*. Here the energy storage element 30 is a in lower end-position where the energy storage element is loaded with energy that forces the energy transfer element 50 in the upward direction, that in turn provides a counterclockwise torque on the shift axle 10.
FIG. 4*d* illustrates in a partly sectionalized view the vehicle gear shift system 1 of FIG. 4*a*. Here the energy storage element 30 is an upper end-position where the energy storage element is loaded with energy that forces the energy transfer element 50 in the downward direction, that in turn provides a clockwise torque on the shift axle 10.

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent embodiments defined in relation to the numbered embodiments are described. Unless otherwise specified, any embodiment that can be combined with one or more numbered embodiments may also be combined directly with any of the dependent embodiments of the numbered embodiment(s) referred to.

ES 1: A vehicle gear shift system (1) configured to move a gear shift element (10) in a multispeed gear system, wherein the gear shift system (1) comprises:

an energy source (20);

an energy storage element (30), and a longitudinal energy transfer element (50) configured to interconnect the gear shift element (10) and the energy storage element (30);

wherein the energy source (20) is configured to load or charge the energy storage element (30) with potential energy via a movement of the energy transfer element (50) in its longitudinal direction with regards to the energy storage element.

In a first dependent embodiment, the energy transfer element (50) is rotationally fixed to the energy storage element (30).

In a second dependent embodiment, that may be combined with the first dependent embodiment, the energy source (20) is configured to rotate the energy transfer element (50) and the energy storage element (30).

In a third dependent embodiment, that may be combined with the second dependent embodiment, the energy transfer element (50) is configured to move longitudinally with respect to the energy storage element (30) when the energy storage element (30) is rotated by the energy source (20) and the gear shift element (10) is providing a counterforce on the energy transfer element (50) above a predefined force limit.

In a fourth dependent embodiment, that may be combined with any of the first to third dependent embodiments, the energy storage element is configured to move the gear shift element in two opposite directions from an equilibrium position wherein the energy storage element is not charged or loaded with energy from the energy source.

In a fifth dependent embodiment, that may be combined with any of the first to fourth dependent embodiments, the energy source is configured to load or charge the energy storage element with positive and negative potential energy relative to the equilibrium position. The sign of the energy depends on the shifting direction selected.

ES2: The pedally propelled vehicle gear shift system of ES1, wherein the energy transfer element (50) is configured to move longitudinally with respect to the energy storage element (30) when the energy storage element (30) is rotated by the energy source (20) and the gear shift element (10) is providing a counterforce on the energy transfer element (50) above a predefined force limit.

In a first dependent embodiment, the energy transfer element (50) is configured to move the gear shift element (10) when the energy storage element (30) is rotated by the energy source (20) and the gear shift element (10) is providing a counterforce on the energy transfer element (50) below the predefined force limit.

In a second dependent embodiment, that may be combined with the first dependent embodiment, the predefined force limit is defined by a pre-tension force of the energy storage element (30), wherein the pre-tension force is acting on the energy transfer element (50).

In third dependent embodiment, that may be combined with the first or second dependent embodiment, the pre-tension force is acting symmetrically on the energy transfer element (50), preventing the energy transfer element (50) to move in any of its longitudinal directions if the absolute value of the counterforce is below the absolute value of the pre-tension force.

In a fourth dependent embodiment, that may be combined with any of the first to third dependent embodiments, the energy transfer element (50) is configured to be arranged between the energy source (20) and the energy storage element (30) and between the energy storage element (30) and the gear shift element (10).

ES3: The pedally propelled vehicle gear shift system of any of ES1 to ES 2, wherein the energy transfer element (50) is configured to move the gear shift element (10) via a threaded interface.

In a first dependent embodiment, the energy transfer element (50) comprises a threaded first portion (51).

In a second dependent embodiment, that may be combined with the first dependent embodiment, the threaded first portion (51) is a worm of a worm drive, wherein a worm gear (11) of the worm drive is rotationally fixed to the shift axle (10).

In a third dependent embodiment, that may be combined with the first or second dependent embodiment, the transfer element (50) comprises;

a second portion (52) interacting with the energy source (20), and a third portion (53) interacting with the energy storage element (30).

ES4: The pedally propelled vehicle gear shift system of any of ES1 to ES 3, wherein the energy storage element (30) comprises a frame (32) and a longitudinally resilient element (31), wherein the frame is holding the resilient element (31), and the energy source (20) is configured to rotate the frame (32).

In a first dependent embodiment, the second portion (52) is rotationally fixed to the frame (32) but allowed to move longitudinally with regards to the frame (32).

In a second dependent embodiment, that may be combined with the first dependent embodiment, the second portion (52) and the frame (32) interface each other in a spline coupling, allowing the second portion (52) to slide inside the frame (32) without rotating relative to the frame.

In a third dependent embodiment, that may be combined with any of the first or second dependent embodiment, the energy storage element (30) comprises first and second end elements (34*a*, 34*b*) arranged on opposite sides of the resilient element (31), wherein the first and second elements can be moved independently from respective first and second opposite end positions (35*a*, 35*b*), with respect to the frame (32), by the energy transfer element (50) in the longitudinal direction of the energy transfer element (50).

In a fourth dependent embodiment, that may be combined with the third dependent embodiment, the energy storage element (50) is configured to move the first end element (34*a*) towards the second end position (35*b*) when it is moved in a first longitudinal direction, and to move the second end element (35*a*) towards the first end position (35*a*) when it is moved in a second longitudinal direction, opposite the first longitudinal direction.

In a fifth dependent embodiment, that may be combined with the third or fourth dependent embodiments, the energy transfer element (50) is configured to allow the first and second end elements (34*a*, 34*b*) to move longitudinally along the third portion (53) and preventing the first and second end elements (34*a*, 34*b*) to move outside the third portion (53).

In a sixth dependent embodiment, that may be combined with any of the third to fifth dependent embodiments, the first and second end elements (34*a*, 34*b*) have the form of washers, and the third portion (53) is arranged through the holes of the washers.

ES 5: The pedally propelled vehicle gear shift system of any of ES1 to ES 4, comprising a control system 60, configured to control the energy provided from the energy source.

In a first dependent embodiment, the control system is configured to initiate energy delivery from the energy source to the energy storage element at a start time T0 and to end energy delivery a pre-defined timespan TS1 after the start time.

In a second dependent embodiment, that may be combined with the first dependent embodiment, the gear shift system comprises a gear operator 70 comprising a gear operator sensor 71 connected to the control system and configured to detect one or more gear shifts of the gear operator wherein the control system is configured to set the start time T0 when a gear shift is detected by the gear operator sensor.

In a third dependent embodiment, dependent on the first or second dependent embodiment, the control system is configured to initiate energy delivery when the gear operator sensor detects a single gear shift.

In a fourth dependent embodiment, dependent on any of the first to third dependent embodiments, the control system is configured to initiate energy delivery when the gear operator sensor detects a double gear shift, wherein the timespan for the double shift is twice the timespan for the single shift.

In a fifth dependent embodiment, dependent on any of the first to fourth dependent embodiments, the control system comprises a cadence detector, and the control system is configured to initiate energy delivery when the cadence detected from the cadence detector is above or equal to an upper threshold or below or equal to a lower threshold.

In a sixth dependent embodiment, dependent on any of the first to fifth dependent embodiments, the pre-defined timespan TS1 is less than 0.5 s, less than 0.3 s or less than 0.2 s for a single gear shift.

In a seventh dependent embodiment, dependent on any of the first to sixth dependent embodiments, the sign of the energy delivery depends on whether the control system initiates an up-shift or a down-shift.

In an eight dependent embodiment, dependent on any of the first to seventh dependent embodiments, the gear shift element comprises end-stops for the upper and/or lower gear.

In a ninth dependent embodiment, dependent on the eight dependent embodiment, the control system is configured to move the shift element until the end-stops for the upper and/or lower gear has been reached as part of an initialization process.

ES 6: The pedally propelled vehicle gear shift system of any of ES1 to ES 5, comprising a gear position detector 61 connected to the control system.

In a first dependent embodiment, the control system is configured to end energy delivery when the position detector indicates that at least one gear has been shifted.

ES7: The pedally propelled vehicle gear shift system of any of ES1 to ES 6, comprising a rotation detector configured to detect rotational movement of the energy storage element 30.

In a first dependent embodiment the pedally propelled vehicle gear shift system comprises a magnet arranged on the energy storage element 30 and a magnetic sensor arranged fixed with regards to the housing.

In a second dependent embodiment, that may be combined with the first dependent embodiment, the magnetic sensor is connected to the control system 60 configured to count rotations of the energy storage element 30.

The gear shift system may be part of an inventive vehicle in different configurations as further described in the embodiments below.

ES 8: A vehicle, comprising;

a crankshaft 101 with pedal arms 102 a drive wheel 103, a transmission 104 arranged between the crankshaft 101 and the drive wheel 103, comprising;

a multispeed gear system 90, wherein a gear ratio of the transmission 104 can be varied by shifting gear in the multispeed gear system;

a vehicle gear shift system according to any of the embodiments ES 1 to ES6.

ES 9: The vehicle of ES8, comprising an electric drive motor 80.

ES10: The vehicle of ES7 or ES8, wherein the multispeed gear system and the energy storage element is arranged in or close to the hub of the driving wheel.

ES11: The vehicle of any of ES 8 to ES10, wherein the control system is configured to control the electric drive motor.

In a first dependent embodiment electric drive motor is configured to drive an input of the multi-speed gear system, and the control system is configured to decrease torque from the electric drive motor after the start time T0.

In a second dependent, that may be combined with the first dependent embodiment, embodiment the control system is configured to decrease torque from the electric drive motor at the timespan T1.

The invention is also a novel and inventive method for gear shifting of a vehicle as described in the embodiments below:

EM 1: A method for shifting gear of a vehicle comprising a multispeed gear system 90, a vehicle gear shift system comprising a movable shift element configured to shift gears in the multispeed gear system, an energy source, and an energy storage element configured to move the shift element, and a longitudinal energy transfer element (50) configured to interconnect the gear shift element (10) and the energy storage element (30); wherein the method comprises;

initiating energy delivery from the energy source to the energy storage element at a start time TO and to end energy delivery a pre-defined timespan TS1 after the start time.

EM 2: The method for shifting gear of a vehicle according to EM 1, wherein the vehicle comprises;

an electric drive motor, and the method comprises;

decrease torque from the electric drive motor after the start time T0.

The features of EM 1 and EM2 may in related embodiments be according to ES 1 to ES 7.

In any of the embodiments above, the vehicle may be a pedally propelled vehicle and/or the vehicle gear shift system may be a pedally propelled vehicle gear shift system.

In a specific embodiment illustrated in FIGS. 1 and 2, the vehicle gear shift system 1 is configured to rotate a movable shift element 10. Only one end of the shift element 10 is illustrated in the drawing, however, in this embodiment, the shift element is a rotatable shift axle, where the rotational position of the shift axle determines the gear ratio of a multispeed gear system. A multi-speed gear system making use of such a rotatable shift axle is specified in detail in e.g., WO2020130842 A1.

A worm gear 11 is attached to the end of the shift axle 10. The worm gear may also be integrated with the shift axle but is here attached to the end of the shift axle with a spline coupling, allowing easy mounting and removal of the gear shift system and the worm gear from the shift axle.

The gear shift system comprises a longitudinal energy transfer element 50 with a threaded first portion 51, that may be seen as a worm in mesh with the worm gear 11 in a worm drive.

An energy storage 30 comprises a frame 32, that may also be a housing for the energy storage. The frame 32 is connected to the output of an energy source 20, in this case an electric motor, via a gear drive 40. Further, the threaded first portion 51 of the energy transfer element 50 extends out of the frame and is rotationally fixed to the frame. Thus, when the energy source rotates the frame 32, the threaded first portion 51 will rotate with the frame and rotate the worm gear 11 and the shift axle 10, in order to change to a higher or lower gear ratio. Here, rotation in one direction will change to higher gears, and rotation in the opposite direction will change to lower gears.

The gear shift system explained so far, could be used for shifting of gears under operating conditions where the shift axle can be easily rotated, e.g., where there is little counter torque on the shift axle from a rider or an assisting electric motor.

In order to ensure gear shifts to happen also where the counter torque is larger, the present embodiment comprises some additional features that can be seen in FIG. 3, which is a cross section of a detail in FIG. 2, more specifically the energy storage 30, and its internal elements.

As previously explained, the energy storage is configured to be loaded with potential energy from the energy source. In this embodiment the energy storage comprises a resilient element 31 in the form of a compression spring, which in an equilibrium position is held between first and second end stops 36*a*, 36*b* of the frame 32. A first end element 34*a* is arranged between a first end 31*a* of the spring and the first end stop 36*a*. Likewise, a second end element 34*b* is arranged between a second end 31*b* of the spring and the second end stop 36*b*. The first and second end stops have the shape of washers.

Both the first and second end elements 34*a*, 34*b* and the first and second end stops 36*a*, 36*b* have through holes, where the through holes of the first and second end stops 36*a*, 36*b* are larger than the through holes in the first and second end elements 34*a*, 34*b*.

The energy transfer element 50 extends through or partly through the holes. More specifically, a third portion 53 of the energy transfer element 50 extends through the resilient element 31 and the first and second end elements 34*a*, 34*b*, and the diameter of the third portion 53 is slightly smaller than the inner diameter of the holes of the first and second end elements 34*a*, 34*b*, allowing them to slide along the third portion 53. At each end of the third portion, the diameter increases to a value larger than the holes of the first and second end elements 34*a*, 34*b*, but equal to or smaller than the inner diameters of the first and second end stops 36*a*, 36*b*, such that the energy transfer element 50 can move longitudinally inside the frame 32.

The resilient element 31 is pretensioned, i.e., pre-compressed in the frame 32. To move the energy transfer element 50 in one direction or the other, a certain force overcoming the pre-tensioning is required.

Between the third portion 53 and the first portion 51 of the energy transfer element 50, a second portion 52 is rotationally fixed but axially free with regards to the frame 32. I.e., the second portion 52 will rotate with the energy storage element 30, while still being able to move longitudinally. This is achieved by a splined coupling where the second portion 52 has external longitudinal splines and the inner diameter of the corresponding part of the frame has corresponding inner longitudinal splines.

The frame 32 is rotationally supported by a first rotational bearing 55. In addition, one end of the energy transfer element 50 is supported rotationally and longitudinally by a slide bearing 56.

Further, the energy storage element 30 comprises a magnet in its side wall, allowing a magnetic sensor arranged in the housing and connected to a control system to detect each time a full rotation has been completed in order to control the electric motor to stop when the required number of turns for the requested gear shift(s) has been reached.

The functionality of the gear shift system will further be explained with reference to FIGS. 4*b* to 4*d*.

Considering first that in FIG. 4*b* the resilient element is in an equilibrium position, where a force acting on the energy transfer element 50 must overcome the pre-tension force on the resilient element to move the transfer element longitudinally.

Considering also, in a first scenario that the shift axle 11 can be rotated with a minimum torque to change gears, i.e., the counter torque from the shift axle acting on the energy transfer element via the worm drive is small compared to the pre-tensioning of the resilient element 31. When the electric motor rotates the energy storage element 30, the energy transfer element 50 and its first portion with the worm also rotates. The rotating worm will act on the worm gear 11 and the shift axle 10. Thus, the rotation of the shift axle is directly proportional to the rotation of the energy storage 30 and to the rotation of the motor axle driving the energy storage element via the gear drive 40.

The rotational direction of the shift axle depends on the operating direction of the motor.

The actual rotational angle for the shift axle 10 required for switching from one gear to the next depends on the geometry of the gear system itself. Anyhow, for a multispeed gear system, continuous rotation would typically mean that multiple gear shifts may happen sequentially as the energy storage element 30 continues to rotate. For e.g., a seven-gear system initially in the first gear, any of the second, third, fourth, fifth, sixth or seventh gears can be selected by rotating the energy storage element in a single direction. For any single or multiple shifts in the opposite direction, the energy storage element 30 is rotated in the opposite direction.

Turning now to FIG. 4*c*, illustrating a different scenario where the intention is to rotate the shift axle 10 counterclockwise to switch one or more gears. However, due to the counter torque on the shift axle being comparatively larger than the pre-tensioning of the resilient element 31, the resilient element is further compressed by the upper end of the energy transfer element 50 and the first end element 34 as the energy storage element 30 and the energy transfer element 50 rotates and the threaded first portion 51 climbs the worm gear that resists rotation.

FIG. 4*c* illustrates an end position of the energy transfer element 50 and the resilient element 31. It should be noted that the resilient element in this position has been loaded with potential energy, and that the force that it is acting on the energy transfer element in the upward direction with, is considerably larger than the pre-tension force at equilibrium. Thus, if at any time from the equilibrium position to the end position, the absolute value of the increasing upward force on the energy transfer element surpasses the absolute value of the downward force acting on the energy transfer element as a result of the counter torque on the shift axle, the shift axle will be forced to rotate in the counterclockwise direction as intended, and the energy transfer element return to its equilibrium position.

In the event that the counter torque still cannot be overcome by the force from the energy storage, the gear change will be performed only after the torque on the shift element has decreased to a value allowing shifting.

If switching of more gears in the same direction is intended, rotation of the energy storage element should continue according to the scenario in FIG. 4*b* or 4*c*.

The energy storage element 50 in FIG. 4*c* is illustrated in an end position, e.g., no further longitudinal movement downwards is possible since the end of the worm drive has been reached. The end position may correspond to a fixed number of gears changes, e.g., one, two or three. If e.g. the end position corresponds to two gear shifts and the control system only requested one shift, rotation of the energy storage element 30 should stop as soon as the required number of rotations for shifting one gear has been reached, before the end position of the energy transfer element 50.

FIG. 4*d* illustrates another scenario where the intention of the rider is to rotate the shift axle clockwise, i.e., opposite of the direction of the previous scenario in FIG. 4*c*. Due to the counter torque on the shift axle being comparatively larger than the pre-tensioning of the resilient element 31, the resilient element is further compressed by the lower end of the energy transfer element 50 and the second end element 34 as the energy storage element 30 and the energy transfer element 50 rotates and the threaded first portion 51 climbs the worm gear that resists rotation.

The rest of the scenario can be understood from the description of FIG. 4*c*, with the forces acting in the opposite directions.

Figure 5:
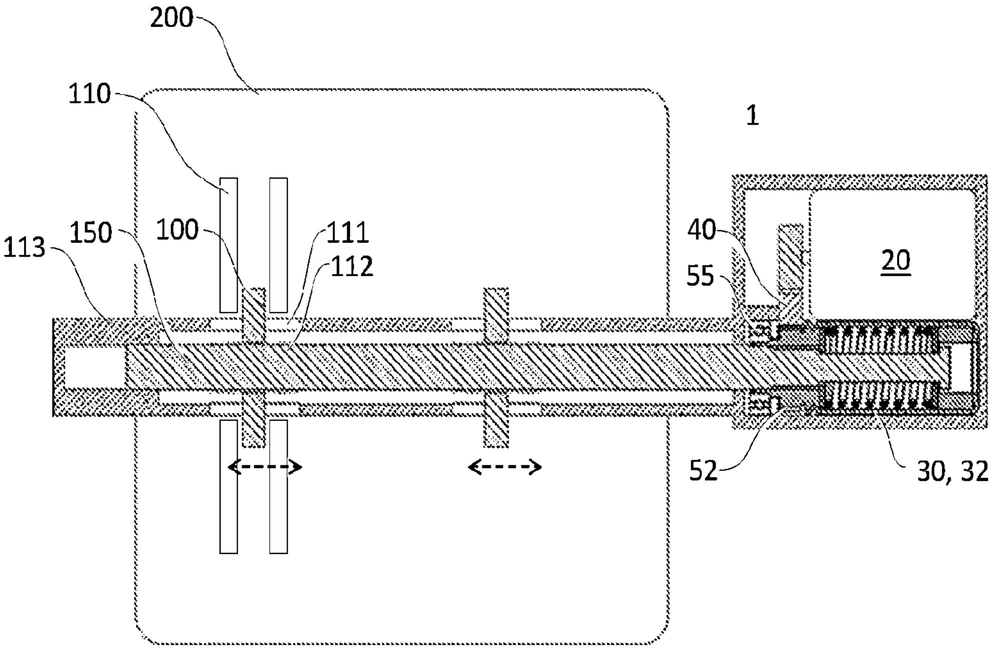
FIG. 5 Illustrates in a sectional and partly schematic view a vehicle gear shift system 1 according to an embodiment of the invention.
Figure 7:
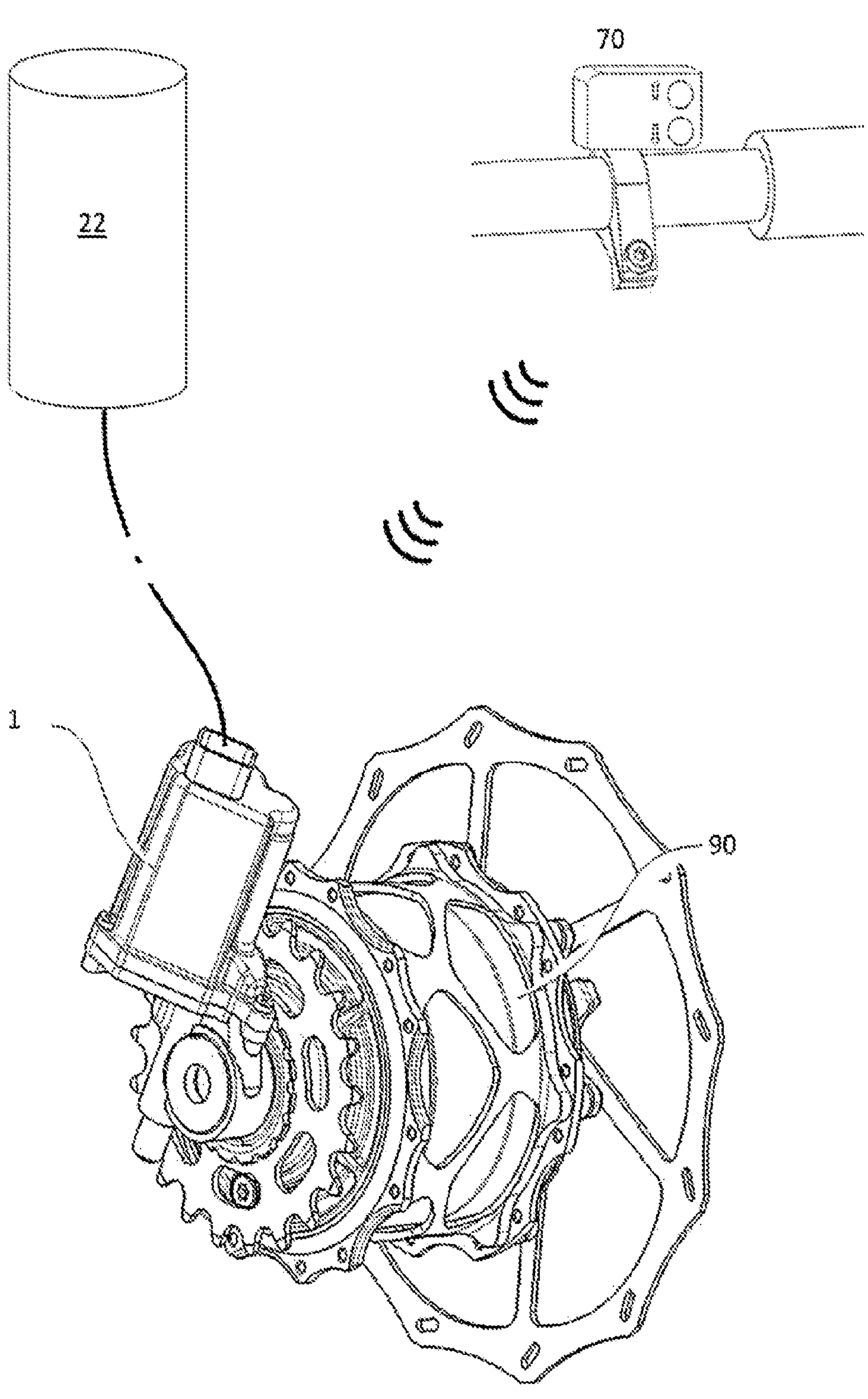
FIG. 7 illustrates the gear shift system 1 operating as a gear shift actuator of an internal multi-speed hub-gear of a pedally propelled vehicle. The multi-speed gear system 90 comprises planetary gear sets and could e.g. be the type of gear disclosed in WO2020130841. A battery 22 providing electric energy to the control system and the motor of the shift system is indicated as connected via electric connectors. The battery could e.g. be located inside the seat-pin or in any other suitable location. A wireless gear operator 70 arranged on the handlebar is connected to the control system.
Figure 8:
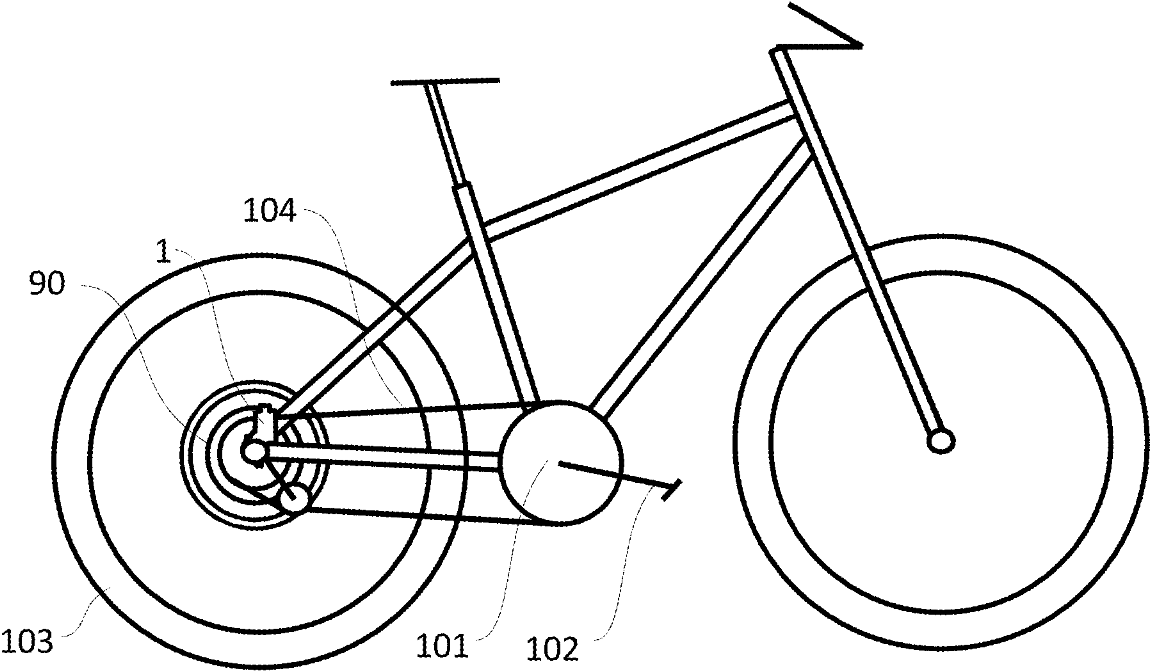
FIG. 8 illustrates a side view of a vehicle including the gear shift system 1 according to one or more embodiments of the present invention.

FIG. 5 illustrates another embodiment of the invention where the shift element 110 is one or more pawls or notches that are moved in a transverse direction of the gear to engage and disengage gears in an internal gear. The actual type of internal gears is not important for the invention and are therefore not illustrated in the drawing. However, considering that the gear system has a housing 200, through which a main axle 113 extends, where the main axle may be fixed to a frame of the vehicle. The input and output elements of the gear system has not been shown, but typically an input axle could be arranged coaxially and rotationally outside the main axle, and the housing itself could be directly connected to the output element and rotate relative to the main axle and the input axle.

Here the internal elements of the energy storage elements 30 and their functionality is the same as in the embodiment above. The energy source and the drive gear could also be the same. The main difference is that the energy transfer element 150 extends into the main axle 113 and interacts with shift elements 100 via a threaded interface. In this case a portion 112 of the energy transfer element and an internal part of the shift element are correspondingly threaded. Thus, when the energy transfer element 150 is rotated by the energy source, the shift element 100 will move laterally in slits 112 in the main axle and move internal gear elements 113 sideways and change the way internal gears mesh.

In the same way as for the embodiment above, the energy storage element 30 will become loaded with potential energy should the counter torque from the internal gear elements exceed the pre tensioning of the resilient element. As the energy transfer element rotates, the force from the shift element acting on the internal gear elements increases, and if this force at any time increases above the force in the opposite direction as a result of counter torque, the internal gear elements will move to shift gears.

As a further alternative to the embodiment in FIG. 5, the energy transfer element 150 could be split in two, where the two parts are interconnected with angular gears, e.g. bewel gears, that would allow the gear shift system to be arranged more conveniently on the vehicle.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A vehicle gear shift system configured to move a gear shift element in a multispeed gear system, the vehicle gear shift system comprising:

an energy source;

an energy storage element; and a longitudinal energy transfer element configured to interconnect the gear shift element and the energy storage element, wherein the energy source is configured to load or charge the energy storage element with potential energy via a movement of the energy transfer element in its longitudinal direction with regards to the energy storage element, and wherein the energy storage element is configured to move the gear shift element in two opposite directions from an equilibrium position in which the energy storage element is not charged or loaded with energy from the energy source.

2. The vehicle gear shift system of claim 1, wherein the energy transfer element is rotationally fixed to the energy storage element.

3. The vehicle gear shift system of claim 2, wherein the energy source is configured to rotate the energy transfer element and the energy storage element.

4. The vehicle gear shift system of claim 1, wherein the energy transfer element is configured to move longitudinally with respect to the energy storage element when the energy storage element is rotated by the energy source and the gear shift element is providing a counterforce on the energy transfer element above a predefined force limit.

5. The vehicle gear shift system of claim 4, wherein the energy transfer element is configured to move longitudinally with respect to the energy storage element when the energy storage element is rotated by the energy source and the gear shift element is providing a counterforce on the energy transfer element above the predefined force limit.

6. The vehicle gear shift system of claim 4, wherein the energy transfer element is configured to move the gear shift element when the energy storage element is rotated by the energy source and the gear shift element is providing a counterforce on the energy transfer element below the predefined force limit.

7. The vehicle gear shift system of claim 4, wherein the predefined force limit is defined by a pre-tension force of the energy storage element, wherein the pre-tension force is acting on the energy transfer element.

8. The vehicle gear shift system of claim 4, wherein the energy transfer element is configured to move the gear shift element via a threaded interface.

9. A vehicle, comprising:

a crankshaft with pedal arms;

a drive wheel;

a transmission disposed between the crankshaft and the driving wheel, the transmission comprising:

a multispeed gear system, in which a gear ratio of the transmission can be is varied by shifting gear in the multispeed gear system; and the vehicle shift system gear according to claim 1.

10. A method for shifting gear of a vehicle including a multispeed gear system, a vehicle gear shift system including a movable shift element configured to shift gears in the multispeed gear system, an energy source, an energy storage element configured to move the shift element, and a longitudinal energy transfer element configured to interconnect the gear shift element and the energy storage element, the method comprising:

initiating energy delivery from the energy source to the energy storage element at a start time and to end energy delivery a pre-defined timespan after the start time, the energy storage element being configured to move the movable shift element in two opposite directions from an equilibrium position in which the energy storage element is not charged or loaded with energy from the energy source.

11. The method for shifting gear of the vehicle according to claim 10, wherein the vehicle comprises an electric drive motor, and the method further comprises decreasing torque from the electric drive motor after the start time.

* * * * *